(12) United States Patent
Romi

(10) Patent No.: US 6,203,312 B1
(45) Date of Patent: Mar. 20, 2001

(54) CLAMPING APPARATUS FOR A TIEBARLESS INJECTION MOULDING MACHINE

(75) Inventor: Romeu Romi, Santa Barbara d'Oeste (BR)

(73) Assignee: Industrias Romi, S.A. (BR)

( * ) Notice: Subject to any disclaimer, the term of this patent is extended or adjusted under 35 U.S.C. 154(b) by 0 days.

(21) Appl. No.: 09/203,630

(22) Filed: Dec. 1, 1998

(30) Foreign Application Priority Data

Mar. 23, 1998 (BR) .................................................. 9800139

(51) Int. Cl.[7] .................................................. B29C 45/64
(52) U.S. Cl. ...................... 425/595; 425/451.9; 425/589; 100/231; 100/258 A
(58) Field of Search ................................ 425/451.9, 595, 425/589; 100/231, 258 A

(56) References Cited

U.S. PATENT DOCUMENTS

| | | | |
|---|---|---|---|
| 4,961,372 | 10/1990 | Leonhartsberger | 92/109 |
| 5,249,951 | 10/1993 | Leonhartsberger et al. | 425/589 |
| 5,297,952 | 3/1994 | Leonhartsberger | 425/593 |
| 5,354,196 | 10/1994 | Ziv-Av | 425/589 |
| 5,536,166 | 7/1996 | Schad | 425/589 |
| 5,556,656 | 9/1996 | Lampl et al. | 425/589 |
| 5,578,333 | 11/1996 | Schad et al. | 425/588 |
| 5,593,711 | 1/1997 | Glaesener | 425/595 |
| 5,620,723 | 4/1997 | Glaesener et al. | 425/589 |
| 5,624,695 | 4/1997 | Glaesener et al. | 425/589 |
| 5,633,024 | 5/1997 | Ziv-Av | 425/589 |
| 5,645,875 | 7/1997 | Glaesener et al. | 425/589 |
| 5,650,182 | 7/1997 | Füller et al. | 425/589 |
| 5,660,783 | 8/1997 | Urbanek et al. | 264/328.1 |
| 5,700,502 | * 12/1997 | Hehl | 425/595 |
| 5,762,984 | 6/1998 | Wimbauer | 425/589 |
| 5,783,231 | 7/1998 | Füller et al. | 425/451.9 |
| 5,800,843 | 9/1998 | Kappelmüller et al. | 425/150 |

FOREIGN PATENT DOCUMENTS

| | | |
|---|---|---|
| 2064415 | 6/1981 | (GB) . |
| 2-18009 | 1/1990 | (JP) . |
| 8-276482 | 10/1996 | (JP) . |

* cited by examiner

*Primary Examiner*—James P. Mackey
(74) *Attorney, Agent, or Firm*—Steinberg & Raskin, P.C.

(57) ABSTRACT

A clamping apparatus for a tiebarless injection moulding machine is arranged to absorb all of the clamping forces. The machine has a machine frame supporting a fixed platen and a movable platen which carry mould halves. The movable platen is slidable along linear guide rails as is a force transmission member or second movable platen incorporated in a drive for the movable platen. The drive comprises a hydraulic cylinder and piston unit. A clamping structure has two, parallel clamping frames, each of which is substantially U-shaped so that upstanding clamping arms are defined in each clamping frame. Each clamping arm terminates in a respective force transmission part which has a curved surface and which abuts a respective one of the fixed platen and the second movable platen. When a moulding operation is undertaken, the mould halves carried by the fixed and movable platens are brought into clamping contact. The fixed platen remains contacted by force transmitting parts of the clamping frames and the second movable platen also contacts the force transmitting parts of the clamping frames. When full clamping force is applied to the mould halves, the curved surfaces of the parts receive the reaction forces and transmit those forces to the clamping frames which become deformed due to the absorption of the clamping forces. The absorption of the forces by the clamping frames, protects the machine frame against any deformation by the clamping forces.

13 Claims, 8 Drawing Sheets

CLAMPING APPARATUS FOR A TIEBARLESS INJECTION MOULDING MACHINE

BACKGROUND TO THE INVENTION

The present invention relates to a clamping apparatus for a tiebarless injection moulding machine.

Tiebarless injection moulding machines offer better access to the moulding tool, and thereby facilitate and reduce the set up time of the machine each time the moulding tool is changed. Of course, as a tiebarless moulding machine does not have tiebars to absorb the huge forces transmitted to the platens and moulding tool during a moulding process it is imperative to have a properly designed mechanism to absorb the forces. In this respect, it is necessary that the two mould halves forming the moulding tool remain accurately aligned with each other whilst the two halves are pressed together and under application of high pressure.

Several attempts have been made to provide a tiebarless injection moulding machine which is able to deal with the clamping forces in a satisfactory manner.

U.S. Pat. No. 5,354,196 describes a clamping apparatus for a tiebarless injection moulding machine having a machine frame, the clamping apparatus comprising a fixed platen fixed to the machine frame, a movable platen supported by said machine frame, drive means for moving said movable platen towards and away from said fixed platen, and a clamping structure for maintaining the fixed and movable platens in a clamping position, wherein, in the clamping position of the fixed and movable platens, a respective part of the clamping structure is in force transmitting relationship with each of the fixed and movable platens such that the clamping structure is able to absorb clamping forces.

In the arrangement of U.S. Pat. No. 5,354,196 the clamping structure absorbs the clamping forces, whereby the base machine frame is kept from bending, and whereby a tight fit between the two platens is ensured. The arrangement provides a double structure in which the machine frame is isolated from the deforming effects of the clamping forces. Transmission of the clamping forces to the platens is achieved by way of pivotal joints.

However, the structure of U.S. Pat. No. 5,354,196 is somewhat complex and presents a number of practical limitations. Most notably, it has been found difficult to provide pivotal joints which can reliably transmit the huge clamping forces required, whilst preserving the rotational freedom required between the machine frame and the clamping structure.

SUMMARY OF THE INVENTION

It is an object of the present invention to provide a clamping apparatus for a tiebarless injection moulding machine which reduces the limitations of prior proposals.

According to the present invention, in a clamping apparatus of the type defined, the movable platen is in force transmitting relationship with said clamping structure by way of a force transmission member mounted for displacement along said machine frame, and the force transmitting parts of the clamping structure each have a curved surface which abuts a respective one of the fixed platen and the force transmission member.

An embodiment of clamping apparatus of the invention has the advantage that no pivots nor tilting elements are required to interconnect parts of the clamping apparatus. Furthermore, as the clamping structure absorbs all of the substantial clamping forces, the machine frame or base remains always free from stress during the clamping operation.

Preferably, the fixed and movable platens, and the force transmission member, are aligned along a longitudinal plane which incorporates a centre line of the clamping apparatus, and each of the force transmitting parts of the clamping structure abuts the respective one of the fixed platen and the force transmission member at contact points on or near to said longitudinal plane.

In an embodiment, the clamping structure is supported on said machine frame by adjustable support means which enable the position of said contact points to be adjusted.

In one construction, the curved surfaces of the force transmitting parts of the clamping structure are each defined by a respective roller carried by the corresponding force transmitting part.

In an embodiment, linear guide means support and guide said first movable platen and said force transmission member, the displacement of said force transmission member being limited in one direction by stops carried by the machine frame, and being limited in the other direction by the abutment of force transmitting parts of said clamping frames.

The movable platen is preferably mounted for sliding movement along the machine frame, and the force transmission member is similarly mounted for sliding movement along said machine frame.

For example, in an embodiment, one or more linear guide rails extend along the machine frame, and the movable platen and the force transmission member are mounted for sliding movement along said linear guide rails.

In an embodiment, stop means for limiting the displacement of said force transmission member in a direction towards the fixed platen are provided.

The clamping structure is preferably supported by, but movable with respect to, said machine frame.

In a currently preferred embodiment, the clamping structure has two, substantially parallel, clamping frames, each said clamping frame being substantially U-shaped and having first and second spaced arms defining the force transmitting parts thereof, the first arm of each clamping frame abutting said fixed platen, and the second arm of each clamping frame abutting said force transmission member.

Preferably, each first arm abuts an outer surface of said fixed platen, and each second arm abuts an outer surface of said force transmission member.

In an embodiment, each clamping frame has a recess or cutout defining upper and lower longitudinal members of the clamping frame. Support means for the clamping frame are arranged to abut said upper longitudinal member thereof.

In an embodiment, each said support means comprises a pin resiliently supported and guided inside a bracket or plate fixed to said machine frame, and a rimmed wheel or roller connected to the top of said pin, said wheel or roller holding and guiding said clamping frame by means of said upper longitudinal member.

Each said clamping frame may be supported on rollers or wheels carried by the machine frame. Furthermore, the rollers or wheels may be resiliently mounted.

In a preferred embodiment, said drive means incorporate said force transmission member.

The drive means may be powered by any appropriate means. For example, the drive means may be hydraulic, hydro-mechanical or electromechanical.

In an embodiment, said drive means may comprise a hydraulic cylinder and piston unit, the hydraulic cylinder being coupled to said force transmission member, and the piston being coupled to said movable platen.

Alternatively, said drive means may comprise a toggle mechanism coupled between said force transmission member and said movable platen.

Preferably, said clamping structure is arranged to be elastically deformed by the application of clamping forces thereto.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Figure 1:
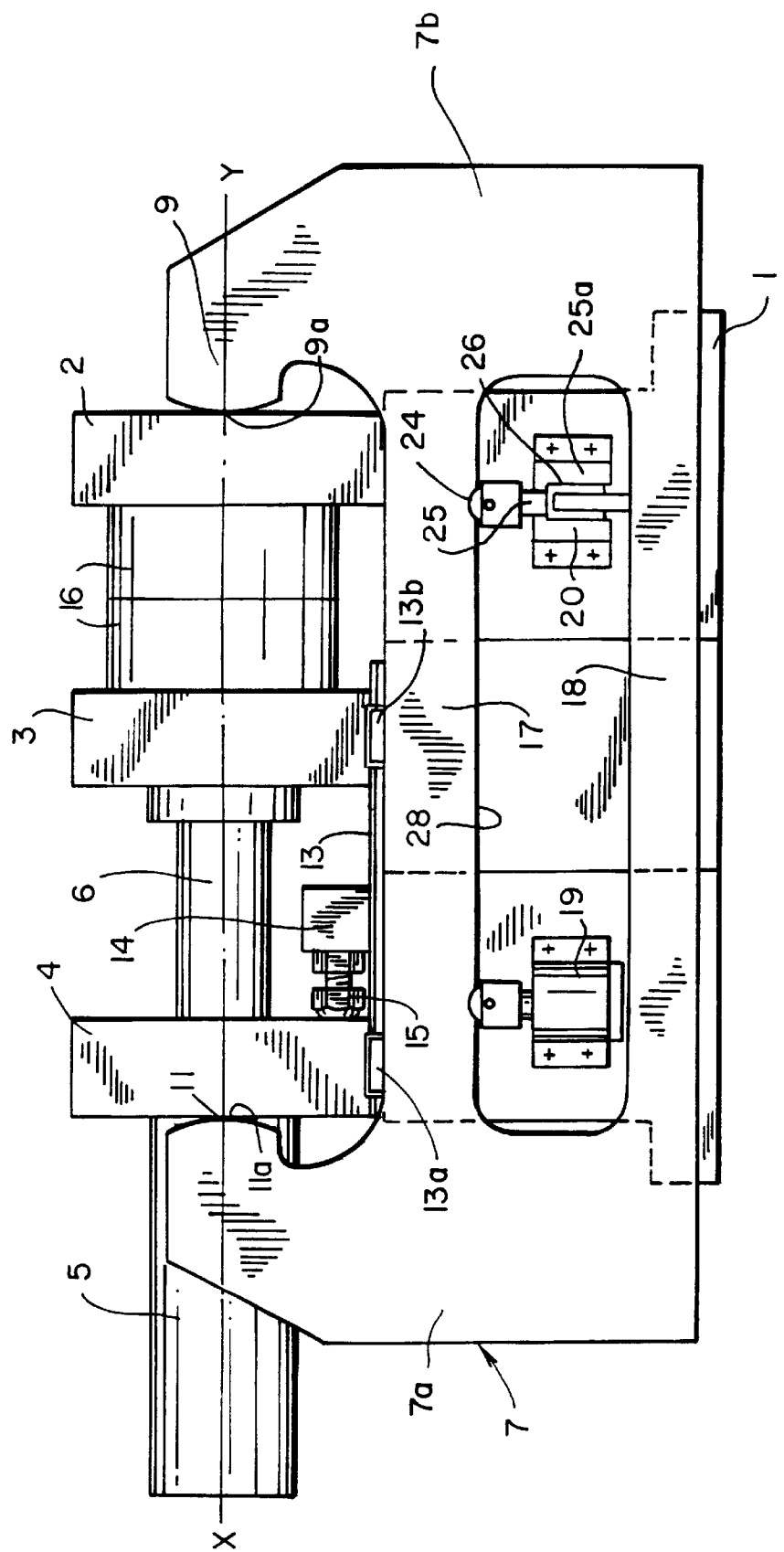
FIG. 1 shows a side view of an embodiment of a tiebarless injection moulding machine having clamping apparatus of the invention.
Figure 2:
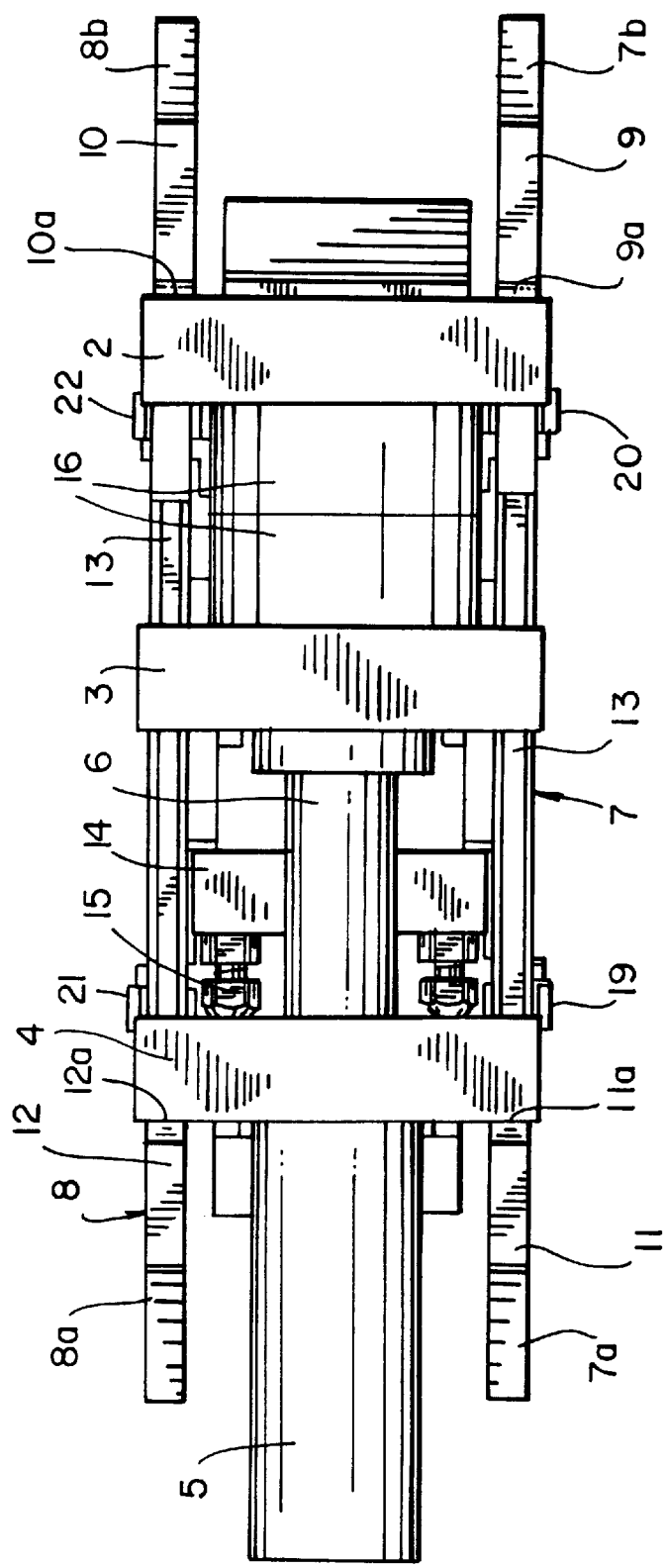
FIG. 2 shows a top view of the machine of FIG. 1.
Figure 3:
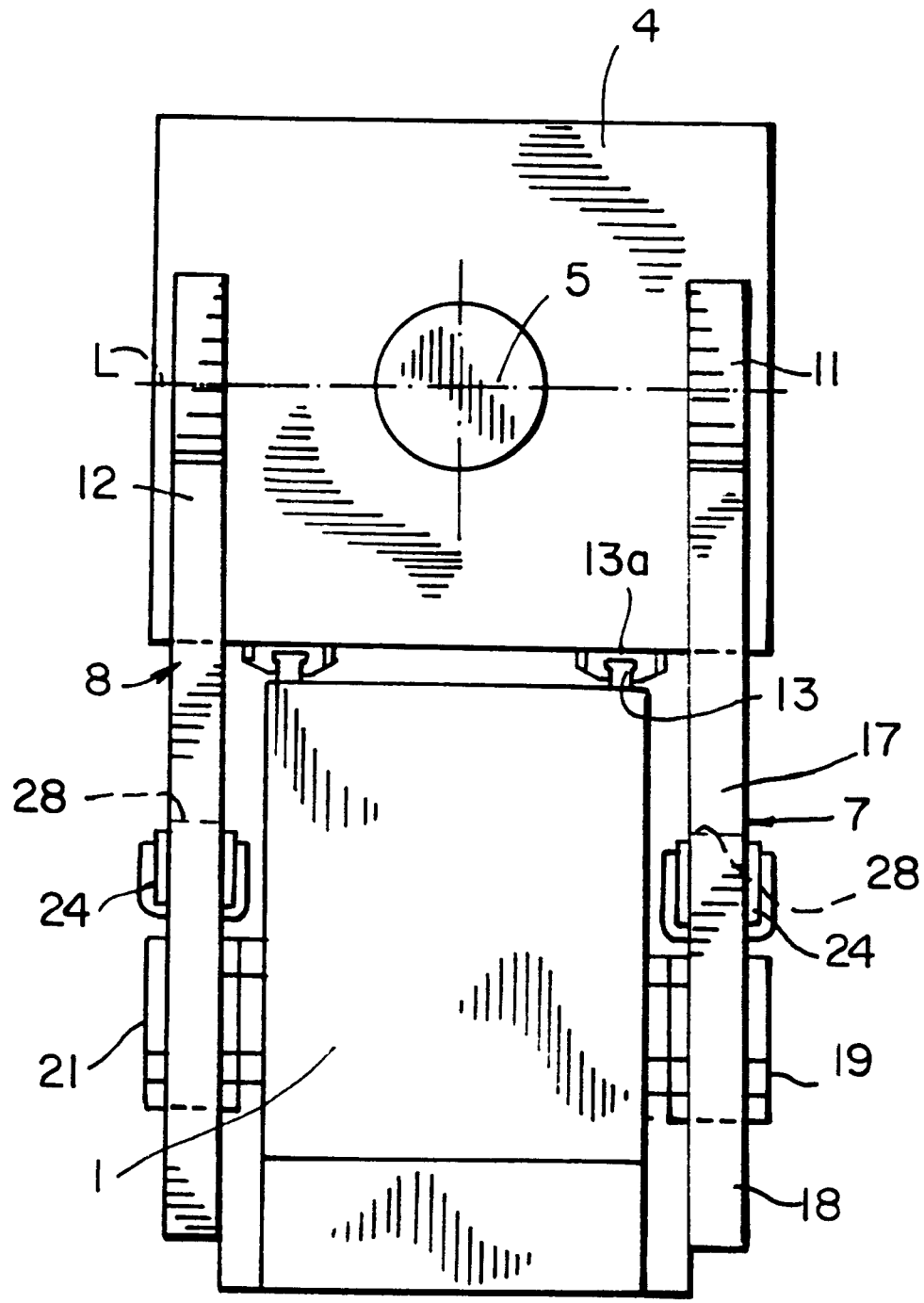
FIG. 3 is an end view of the machine of FIGS. 1 and 2.

As can be seen in FIGS. 1 to 3, a tiebarless injection moulding machine has a machine frame 1 supporting a fixed platen 2 and a movable platen 3. In known manner, the fixed and movable platens 2, 3 are each arranged to carry and clamp respective mould halves 16 of a moulding tool. In this respect, the fixed platen 2 is fixed by any appropriate means to the machine frame 1, and the movable platen 3 has rolling shoes 13b slidable along linear guide rails 13 provided to extend along the machine frame 1.

In the embodiment illustrated, drive means to move the movable platen 3 towards and away from the fixed platen 2 incorporate a force transmission member or second movable platen 4 which is mounted similarly to the movable platen 3 for sliding movement along the linear guide rails 13 by way of respective rolling shoes 13a. The drive means also comprises a hydraulic piston and cylinder unit having a hydraulic cylinder 5 and a piston 6 connected to said first movable platen 3. The second movable platen 4 is rigidly connected to and supports the hydraulic cylinder 5. It will be appreciated that, in known manner, the drive means 4, 5, 6 is arranged to move the first movable platen 3 towards the fixed platen 2 whereby the mould halves 16 carried thereby close to enable moulding to take place.

For effective injection moulding it is essential that the two mould halves 16, and hence the platens on which they are supported, do not move out of alignment. The difficulty, of course, is that high clamping forces can be encountered, and if such forces are absorbed by the machine frame, there is a serious risk of deformation of the machine frame with consequent misalignment of the fixed and movable platens 2 and 3. Tiebars have been, and are still, used to prevent distortion of the machine frame, but such tiebars have been found to have disadvantages. For example, tiebars have been found to be troublesome for mounting moulds, particularly large moulds on the machine platen, and now a tiebarless construction is generally preferred.

In the embodiments illustrated, the clamping apparatus which incorporates the fixed and movable platens 2, 3, is also provided with a clamping structure arranged to absorb clamping forces.

In the embodiment illustrated, the clamping structure comprises two, substantially parallel clamping frames 7 and 8, each of which is substantially U-shaped. Thus, upstanding clamping arms 7a and 7b are defined frame 7, and upstanding arms 8a and 8b are defined in the clamping frame 8. Each clamping arm 7a, 7b, 8a, 8b terminates in a respective force transmission part 11, 9, 12, and 10. It is apparent from FIG. 1, for example, that each force transmission part 9, 10, 11 and 12 has a respective curved surface 9a, 10a, 11a and 12a, each of which abuts a respective part of the outer surface of the fixed platen 2 or of the second movable platen 4.

It will be seen, particularly from FIGS. 1 and 2, that the fixed platen 2, and the first and second movable platens 3 and 4 are substantially identical in size, extend substantially parallel to one another, and are all aligned. A longitudinal axis or centre line X-Y of the platens 2, 3, 4 is defined thereby. A longitudinal plane L (FIG. 3) extends substantially horizontally through the clamping apparatus and incorporates the centre line X-Y. As is indicated in FIG. 1, each of the curved surfaces 9a, 10a, 11a and 12a is arranged to contact the outer surface of the respective platen 2 or 4 at contact points which coincide with, or are very close to, the longitudinal plane L.

Each of the clamping frames 7 and 8 is mounted to a respective side of the machine frame 1 and is supported thereon by respective support means 19, 20, 21 and 22. In this respect, the support means 19, 20, 21, and 22 are arranged to support the clamping frames 7 and 8 on the machine frame, but to allow movement of the clamping structure relative to the machine frame 1. Thus, in the embodiment illustrated, each clamping frame 7 and 8 has a longitudinally extending recess 28 therein which defines upper and lower longitudinal support webs 17 and 18. Each support 19, 20, 21 and 22 comprises an elongate pin, as 25, received within a cylinder, as 25a, in which a spring 26 is also received. At its top each pin 25 carries a disc or rimmed wheel 24 which supports the upper support web 17. The cylinder 25a has a planar flange 25c provided with openings 25d through which screws 25b are introduced to fix the cylinder 25a to the frame 1. The pin 25 may be adjusted in position within the cylinder 25a whereby the vertical position of the clamping frame 7 and 8 relative to the frame 1 may be adjusted. The springs 26 act to facilitate the vertical positioning of the clamping frames and are sufficiently strong to hold the clamping frames 7 and 8 in place once vertically adjusted.

It will be readily appreciated that the clamping structure illustrated has a simplified construction as compared to current proposals. Nevertheless, the clamping frames 7 and 8 as illustrated are capable of absorbing all of the huge clamping forces developed during a closing and clamping action of the injection moulding machine.

In use, the clamping frames 7 and 8 are vertically adjusted by way of the supports 19, 20, 21 and 22 such that the initial contact points between the curved surfaces 9a,10a, 11a and 12a and the outer surfaces of the fixed and second platens 2 and 4 are set substantially on the longitudinal plane L which incorporates the centre line of the platens. In this respect, the contact points can be readjusted to be slightly above or below the longitudinal plane L whereby the best surface contact points are established to ensure that as the clamping arms go through elastic deformation, the contact points always remain on or very close to the longitudinal plane L. By this means, misalignment between the fixed and movable platens 2 and 3 is prevented. It has been found that the curved surfaces 9a, 10a, 11a and 12a very effectively prevent inclination of the second platen 4 when clamping forces are applied thereto.

When a moulding operation is undertaken, the movable platen 3 is displaced by the hydraulic cylinder and piston 5, 6 in a direction towards the fixed platen 2 whereby the mould halves 16 carried by the fixed and movable platens 2 and 3 are brought into clamping contact. The force transmission member or second movable platen 4 is free to be displaced away from the fixed platen 2 such that, in the clamping position, the fixed platen 2 remains contacted by the curved surfaces 9a and 10a of the force transmitting parts of the clamping arms 7b, 8b of the clamping frames 7 and 8, and the second movable platen 4 is brought into contact with the curved surfaces 11a and 12a of the clamping arms 7a, 8a of the two clamping frames 7 and 8.

Figure 4:
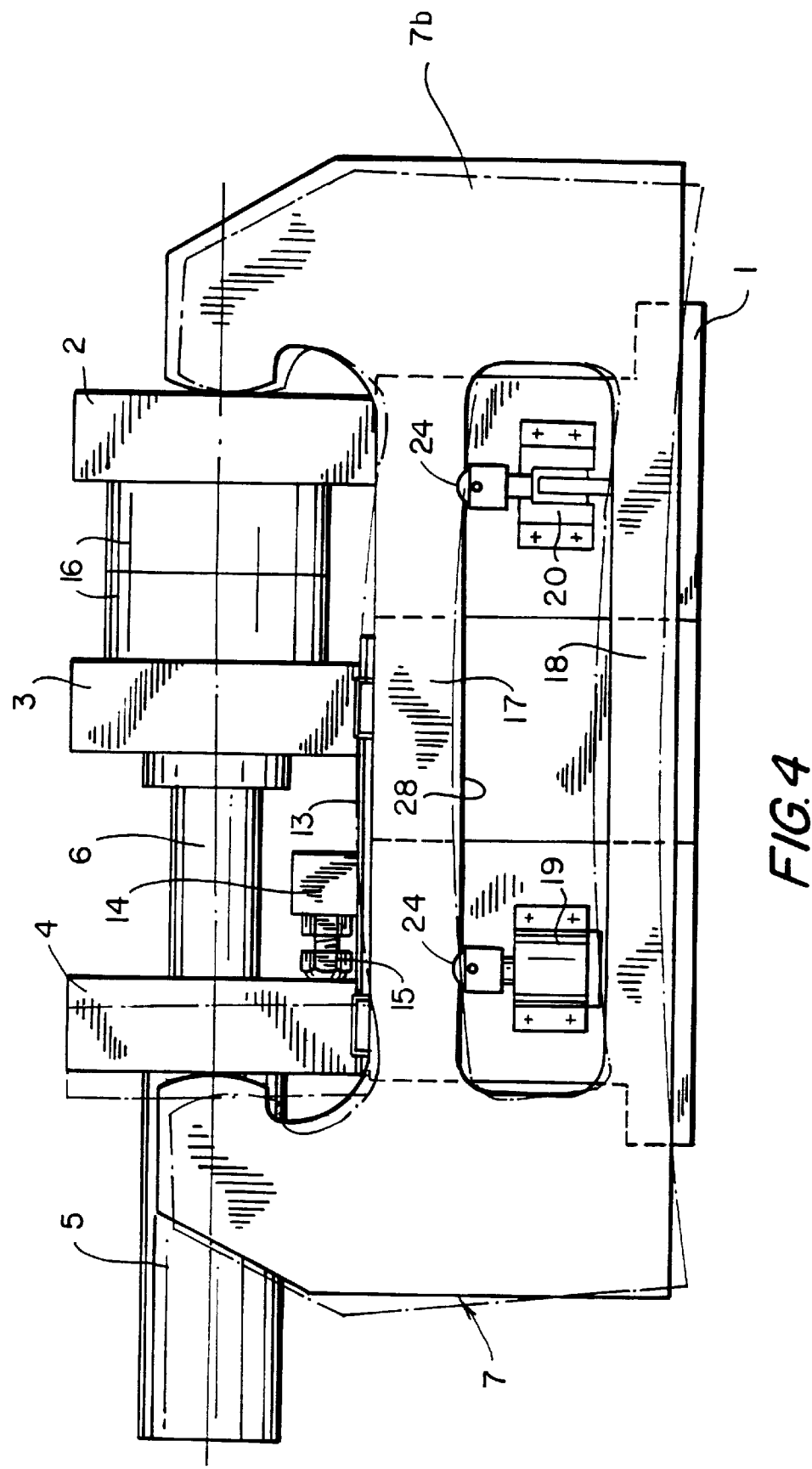
FIG. 4 is a side view as in FIG. 1, but showing in broken lines the elastic deformation of a clamping structure under the application of clamping forces.
Figure 5A:
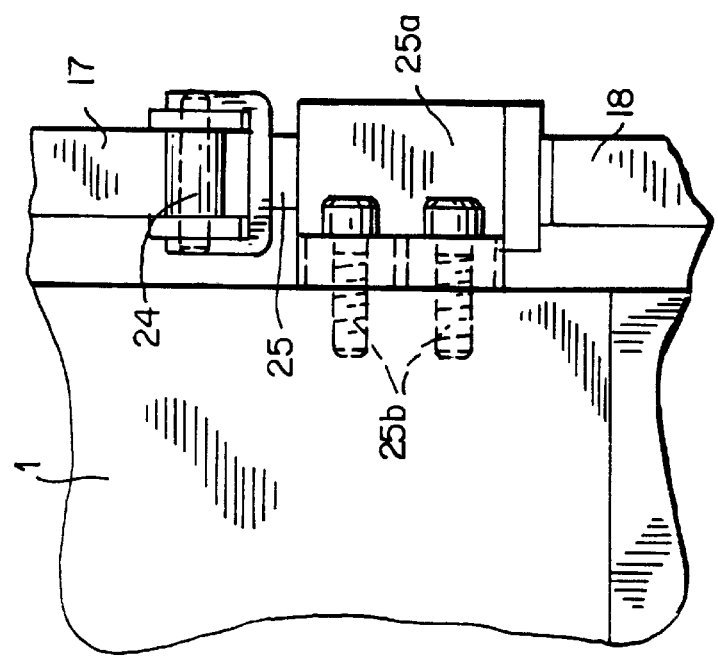
FIG. 5a shows an end view of the support means of FIG. 5.
Figure 5:
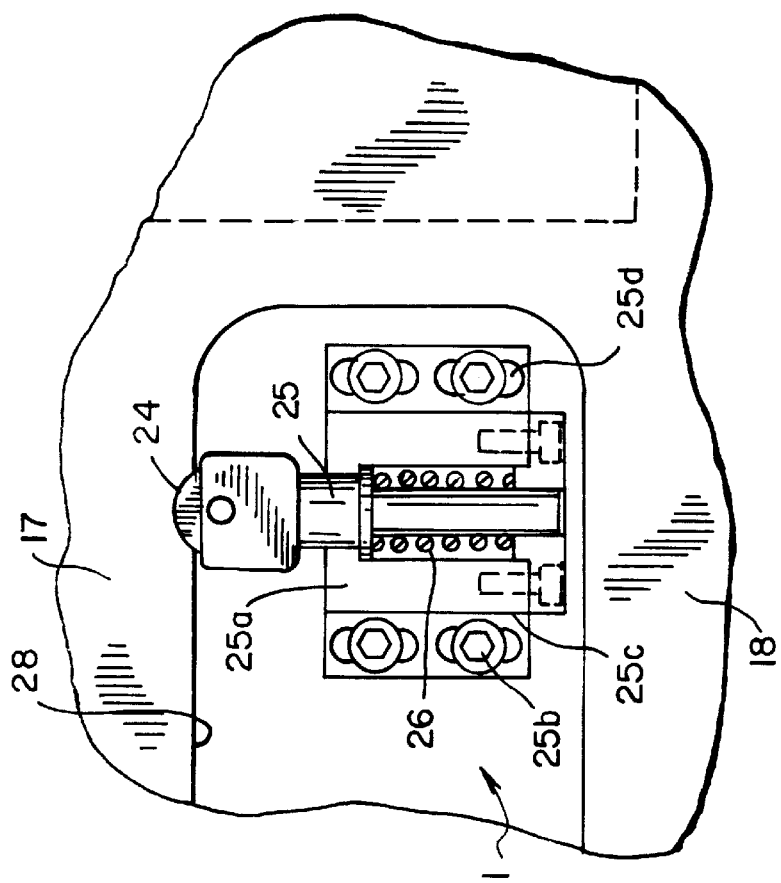
FIG. 5 shows an enlarged detail of FIG. 1 illustrating support means for the clamping structure.

It will be understood that the second movable platen 4 has to be free to move along the linear guides 13 in order to ensure that no reaction force is transmitted to the machine frame 1 when the piston 6 of the drive means closes the two halves 16 of the moulding tool under full hydraulic power. In this situation, the reaction to the clamping forces causes the outer surface of the second movable platen 4 to apply reaction forces to the force transmitting parts 11 and 12 of the clamping frames 7 and 8. When full clamping force is applied to the halves 16 of the moulding tool, it will be appreciated that the curved surfaces of the force transmitting parts 9, 10, 11 and 12 receive the reaction forces and act to transmit those forces to the clamping frames 7 and 8 which are arranged to absorb the forces. This situation is illustrated in FIG. 4 in which the clamping frames 7 and 8 are shown in broken lines after their deformation due to the absorption of clamping forces. As all of the clamping forces are absorbed by the clamping frames 7, 8, the machine frame 1 is protected against any deformation by clamping forces. In its turn, this protects the clamping apparatus against misalignment of the two mould halves 16.

The clamping frames 7 and 8 are designed and arranged to elastically deform so that, upon release of the clamping forces, the clamping frames return to the original set up position. For example, the clamping frames 7 and 8 may be formed of steel or spheroidal graphite cast iron.

When the clamping force is removed from the clamping apparatus, and the movable platen 3 is moved away from the fixed platen 2, the second movable platen 4 will move towards the fixed platen 2. This movement of the second movable platen will be by an amount corresponding to the elastic deformation of the clamping frames which may vary from a fraction of 1 mm to 4 mm depending on machine size. Accordingly, two fixed stops 14 are fixed to the machine frame 1. Each of the stops 14 is provided with an adjusting threaded pin 15 which abuts the second movable platen 4. The threaded pins 15 can be adjusted to ensure that there is no play between the second movable platen 4 and the force transmitting parts 11 and 12 of the clamping frame arms 7a and 8a. Thus, when clamping force is applied, the second movable platen 4 is in contact with the parts 11 and 12 and does not therefore, impact those parts.

It will be appreciated that the stops 14 limit the movement of the second movable platen 4 towards the fixed platen 2. This ensures that retraction of the piston 6 moves the movable platen 3 away from the fixed platen 2, thereby opening the two halves 16 of the moulding tool.

It should be noted that the construction of the clamping apparatus ensures that the clamping frames 7, 8 are only subject to high forces during mould closing and clamping. When the clamping force is removed, the clamping frames are free from forces. During the opening of the mould halves, opening forces arising from the retraction of the piston 6 are opposed by the abutment of the second movable platen 4 against the stops 14.

In the embodiment illustrated in FIGS. 1 to 4 two clamping frames 7 and 8 are provided, one on each side of the machine frame 1. Each platen 2, 4 is therefore contacted by two force transmitting parts, as 11a and 12a, which are spaced along the width of the platen 2, 4. In this way, twisting or other misaligning movement of the respective platen 2, 4 is prevented.

Figure 6:
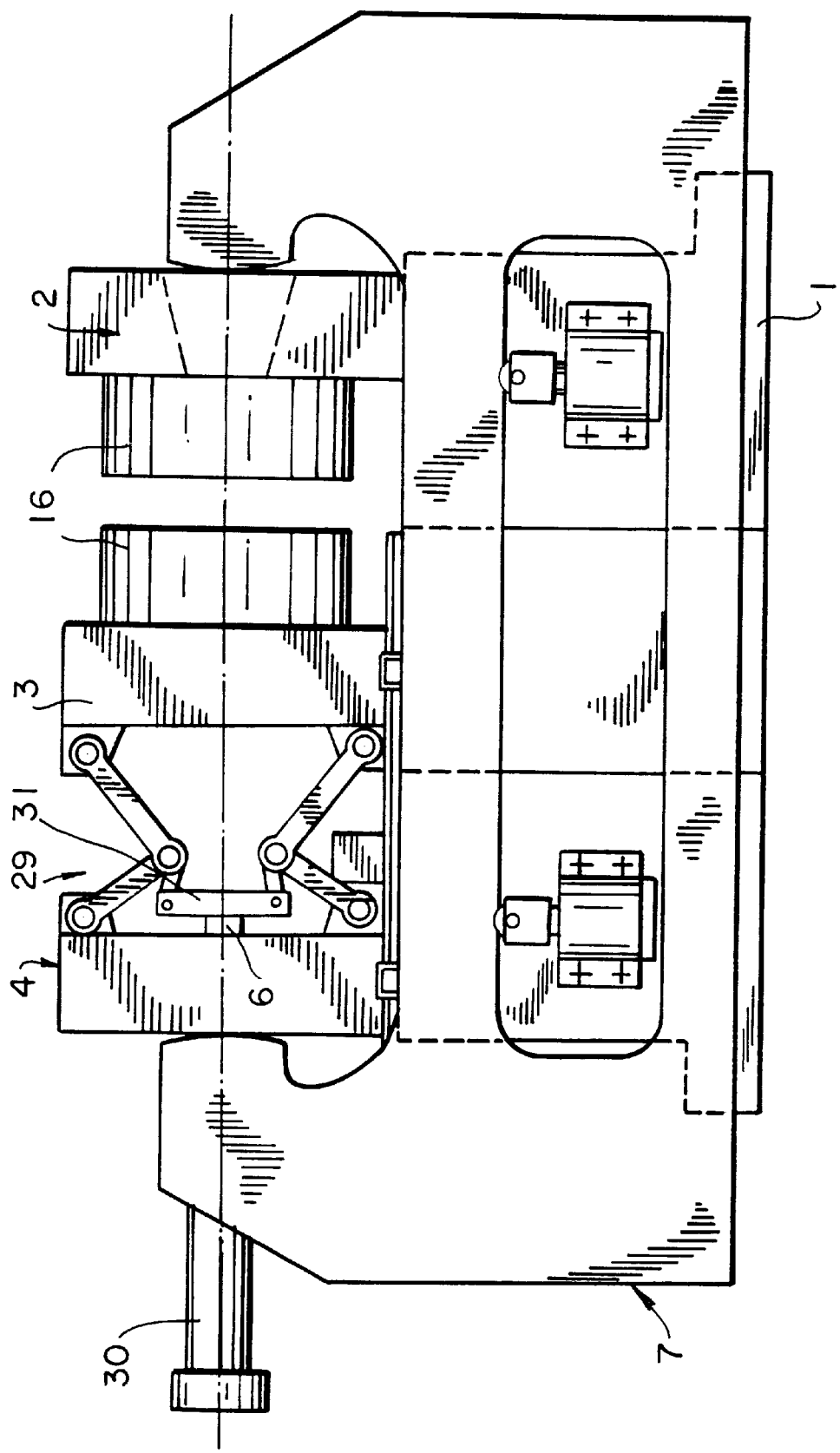
FIG. 6 shows a further embodiment of a clamping apparatus of the invention for a tiebarless injection moulding machine.

FIG. 6 illustrates an alternative embodiment of the present invention in which the drive means has been altered to incorporate a toggle lever assembly 29. In FIG. 6, features which are the same or similar to features of FIGS. 1 to 4 have been given the same reference numerals.

Thus, in the embodiment shown in FIG. 6, a hydraulically powered toggle lever assembly 29, coupled to an hydraulic drive system 30, is provided. Thus, toggle lever arms 31 driven by piston 6 link the second movable platen 4 to the movable platen 3 whereby the spacing between the two movable platens can be adjusted to provide, for example, the necessary clamping forces. An adjustment mechanism for different mould heights may be provided, but is not illustrated in FIG. 6.

Figure 7:
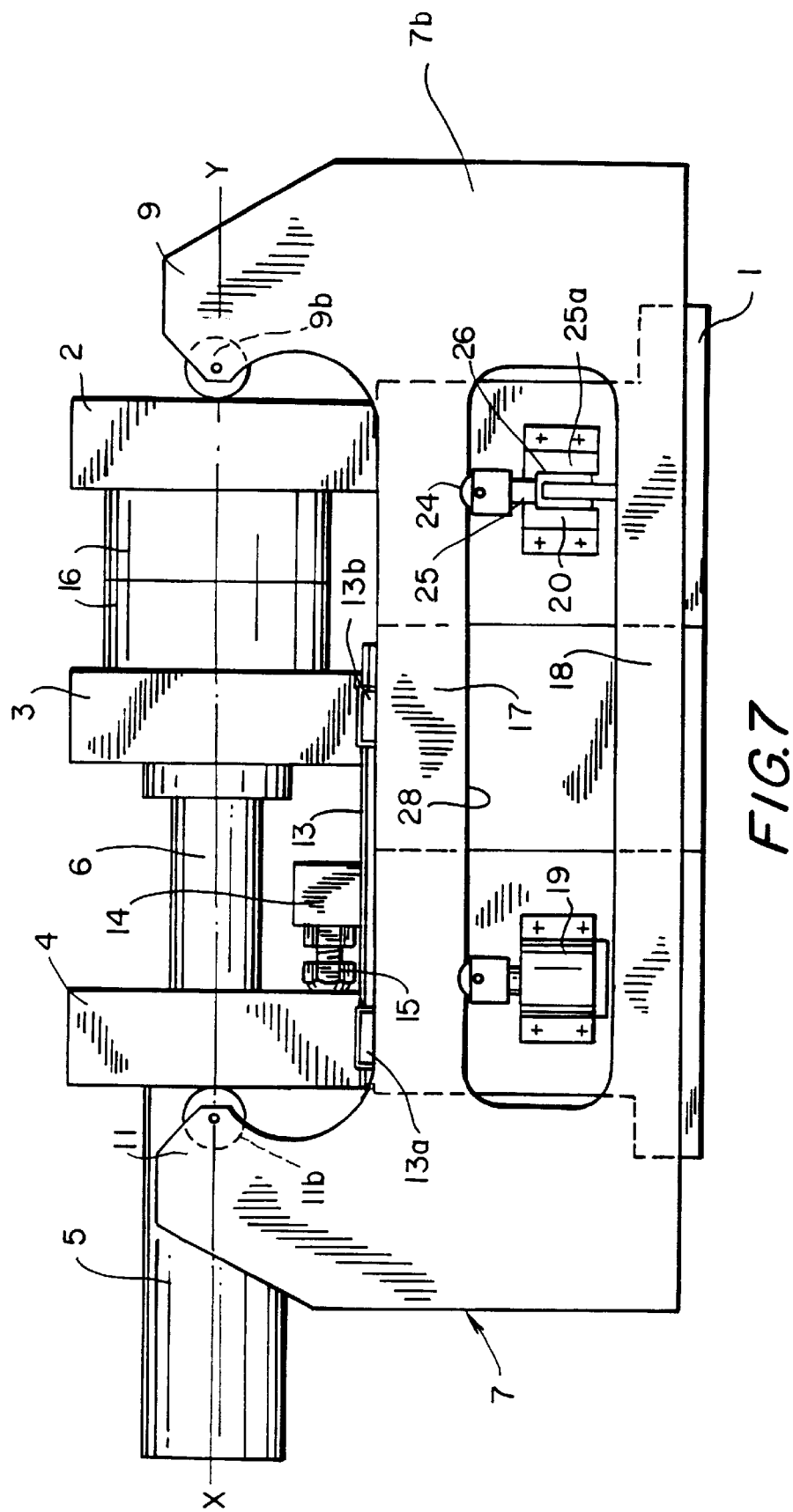
FIG. 7 shows a side view of a still further embodiment of a tiebarless injection moulding machine having clamping apparatus.
Figure 8:
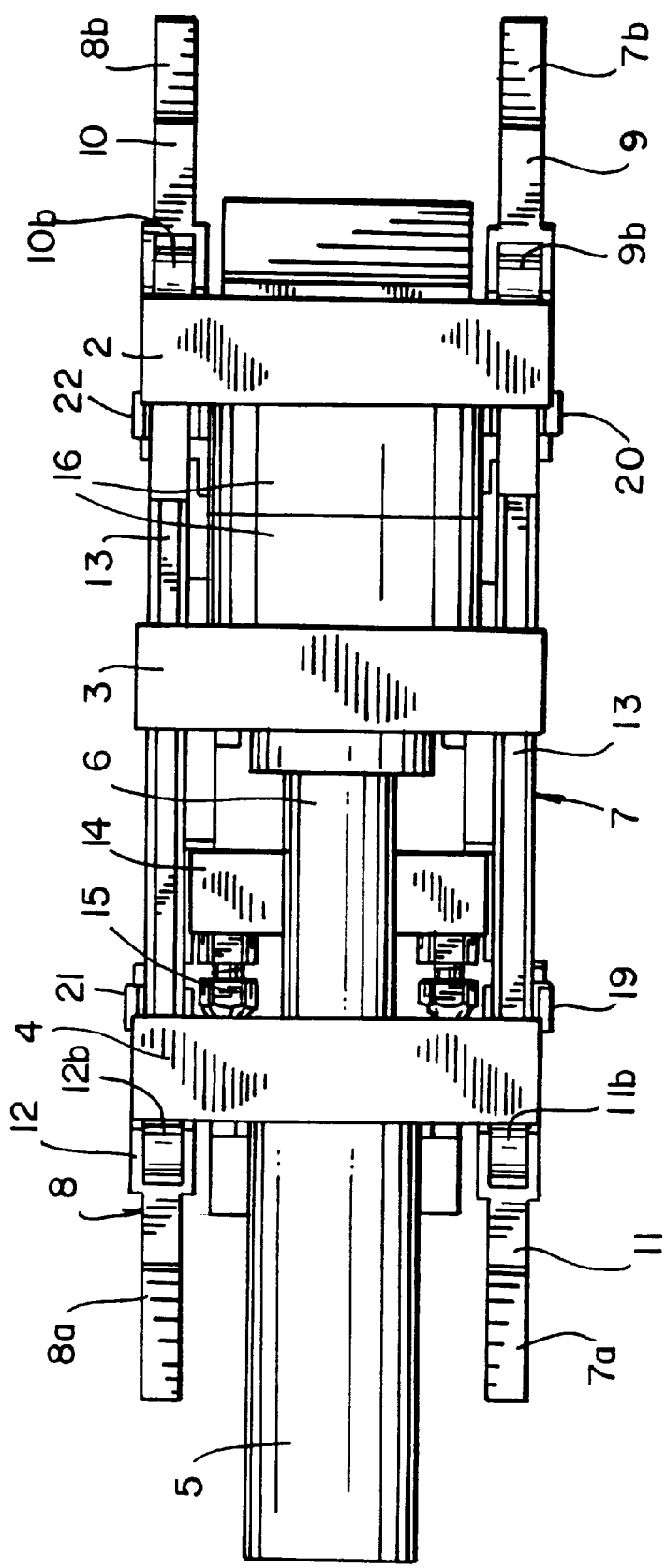
FIG. 8 shows a top view of the machine of FIG. 7.

FIGS. 7 and 8 show a still further embodiment of a clamping apparatus of the invention in which the curved surfaces abutting the fixed and second movable platens 2, 4, are formed on rollers. In FIGS. 7 and 8, features which are the same or similar to features of FIGS. 1 to 4 have been given the same reference numerals.

In the embodiment of FIGS. 7 and 8, each force transmission part 9, 10, 11, 12 carries a respective roller 9b, 10b, 11b, and 12b. Each roller is journalled on the respective force transmission part 9, 10, 11, 12, and part of the circumferential surface of each roller 9b, 10b, 11b, and 12b defines a curved surface which abuts a respective part of the outer surface of the fixed platen 2 or of the second movable platen 4.

It will be appreciated that variations and modifications in the embodiments as described and claimed can be made within the scope of this application as defined by the appended claims.

What is claimed is:

1. A clamping apparatus for a tiebarless injection molding machine comprising:

a machine frame;

a fixed platen coupled to said machine frame;

a first movable platen supported by said machine frame;

drive means for adjusting a position of said first movable platen relative to said fixed platen;

a first and second clamping frame for maintaining said fixed platen and said first movable platen in a clamping position, each of said first and second clamping frames having first and second spaced arms;

a second movable platen operably coupled to said first movable platen;

means for supporting said first and second clamping frames wherein said means for supporting is coupled to said machine frame and is structured and arranged to only exert a vertical supporting force on said first and second clamping frames;

wherein said first and second arms of said first and second clamping frames are structured and arranged to contact said fixed platen and said second movable platen respectively when said first platen and said fixed platen are in a clamping position whereby a clamping force is transmitted to said first and second arms of said first and second clamping frames via said fixed platen and said second movable platen.

2. The clamping apparatus according to claim 1, wherein each of said first and second spaced arms of said first and second clamping frames comprise a curved surface structured and arranged to abut said fixed platen and said second movable platen respectively.

3. The clamping apparatus according to claim 2, wherein said fixed platen, first movable platen and second movable platen have a centerline aligned along a common longitudinal plane and wherein each of said curved surfaces have a contact point where each of said curved surfaces contact a respective one of said fixed platen and second movable platen, said contact points being substantially aligned with said longitudinal plane.

4. The clamping apparatus according to claim 3, wherein each of said first and second clamping frames comprise an upper and lower longitudinal web defining a longitudinal slot and wherein said means for supporting said clamping frames is arranged within said longitudinal slot of said first and second clamping frames.

5. The clamping apparatus according to claim 4, wherein said supporting means is structured and arranged to enable a vertical adjustment of said first and second clamping frames, whereby the position of said contact points are vertically adjustable.

6. The clamping apparatus according to claim 1, further comprising a roller rotatably mounted to each of said first and second spaced arms of said first and second clamping frames, each of said rollers being structured and arranged to abut a respective one of said fixed platen and said second movable platen.

7. The clamping apparatus according to claim 1, wherein said first and second movable platens are mounted for sliding movement along said machine frame.

8. The clamping apparatus according to claim 7, further comprising at least one linear guide rail extending along said machine frame said first and second movable platens being mounted for sliding movement along said at least one linear guide rail.

9. The clamping apparatus according to claim 8, further comprising stop means for limiting a displacement of said second movable platen in a direction toward said fixed platen.

10. The clamping apparatus according to claim 1, wherein each of said first and second clamping frames comprise a substantially U-shaped body.

11. The clamping apparatus according to claim 4, wherein said means for supporting said first and second clamping frames comprises a plurality of wheels arranged in said longitudinal slot of said first and second clamping frames, each of said wheels being structured and arranged to support a respective one of said upper longitudinal webs.

12. The clamping apparatus according to claim 1, wherein said drive means comprises a hydraulic cylinder and piston unit, the hydraulic cylinder being coupled to said second movable platen and said piston being coupled to said first movable platen.

13. The clamping apparatus according to claim 1, wherein said drive means comprises a toggle mechanism coupled between said second movable platen and said first moveable platen.

\* \* \* \* \*